March 13, 1973  P. J. WAZNYS ET AL  3,720,019

REMOTE CONTROLLED BUCKING TOY VEHICLE

Original Filed Dec. 4, 1969  2 Sheets-Sheet 1

INVENTORS
PETER J. WAZNYS
PHILIP D. BART
BY Robertson, Bryan,
Parmelee & Johnson.
ATTORNEYS March 13, 1973  P. J. WAZNYS ET AL  3,720,019

REMOTE CONTROLLED BUCKING TOY VEHICLE

Original Filed Dec. 4, 1969  2 Sheets-Sheet 2

INVENTORS
PETER J. WAZNYS
PHILIP D. BART
BY Robertson, Bryan,
Parmelee & Johnson.
ATTORNEYS

United States Patent Office 3,720,019
Patented Mar. 13, 1973

3,720,019
REMOTE CONTROLLED BUCKING TOY VEHICLE
Peter J. Waznys, Richmond Hill, and Philip D. Bart, Monsey, N.Y., assignors to Remco Industries, Inc., Harrison, N.J.
Continuation of application Ser. No. 882,111, Dec. 4, 1969. This application Dec. 10, 1971, Ser. No. 206,786
Int. Cl. A63h 29/08, 29/22
U.S. Cl. 46—244 A                8 Claims

ABSTRACT OF THE DISCLOSURE

A toy vehicle is provided capable of bucking and turning motions, having a gyrating effect, controlled by a simple remote reversing switch, the vehicle itself being designed to resemble a dune buggy with a surfboard on top. The vehicle includes means for temporarily shifting the center of gravity to a position behind the rear wheels when forward motion is started, so the front wheels lift off the ground momentarily. This shifting of the center of gravity is caused by the rolling from a forward position to a rearward position of a small weighted ball within the surfboard as the car accelerates. Torque in the rear wheels then causes the front wheels to rise. The front wheels of the vehicle normally point in the forward direction but, through a linkage, turn to the side when the direction of motion of the vehicle is reversed. Thus, when moving forward, the vehicle's front wheels momentarily leap into the air; and, in one reverse motion, the whole vehicle turns.

CROSS REFERENCE TO RELATED APPLICATION

This is a continuation of application Ser. No. 882,111, filed Dec. 4, 1969, now abandoned.

SUMMARY OF THE INVENTION

This invention is directed to a small, battery-operated toy vehicle having the appearance of a dune buggy. It includes a reversible motor within the vehicle itself and a remote, wire-connected, reversing switch and battery case. Its structure includes the usual motor, gear train, and wheel interconnections of the type generally found in any toy vehicle. The location of the center of gravity of the entire vehicle, however, as will be described below, is important.

On top of the vehicle are means for shifting the center of gravity behind the rear wheels when forward motion of the vehicle is started. This includes a surfboard mounted on the roof of the vehicle and overhanging in the rear. The board is hollow and carries a heavy weighted ball, such as a steel ball, inside, the ball being free to roll lengthwise. The board is at such an angle that when the vehicle is at rest on a level surface, the ball is in the forward end of the board. When, however, the car accelerates forwardly, the inertia of the ball causes it to roll to the rear of the surfboard and so shifts the center of gravity of the combination surfboard and vehicle to behind the rear wheels. This causes the front wheels to lift off the floor momentarily.

Continued forward motion of the vehicle, after acceleration stops when the motor is stopped, however, causes the front wheels to drop to the floor due to the braking torque in the forwarldy rotating rear wheels. Gravity then causes the ball to roll to its forward position.

The front wheels are pivoted to turn the vehicle. They have an associated linkage which causes them to point forward when the vehicle is moving forwardly, but to turn to one side when the vehicle is going in reverse.

DESCRIPTION OF THE DRAWINGS

FIG. 2 also shows the remote control switch box.

DETAILED DESCRIPTION OF THE INVENTION

Figure 1:
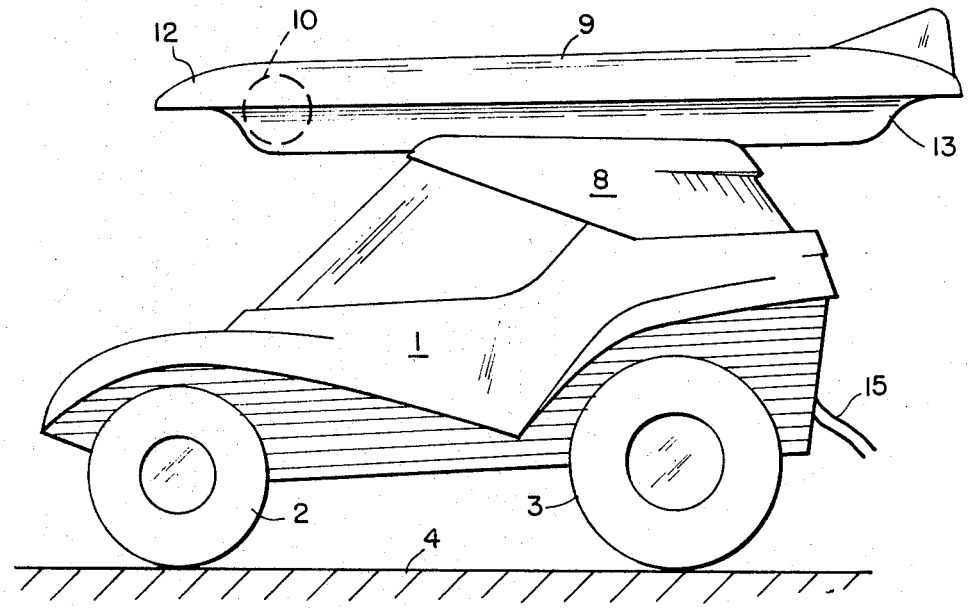
FIG. 1 is a side view of the vehicle showing it at rest.

FIG. 1 shows the vehicle 1 with its front wheels 2 and rear wheels 3 resting on floor 4. Mounted on the roof of vehicle 1 is a hollow structure 9 to control shifting of the center of gravity. Structure 9 is preferably shaped to resemble a surfboard. Inside the board, and free to roll, is a heavy ball 10, such as a steel ball.

Board 9 is mounted at such an angle on roof 8 that, when the vehicle is at rest on a horizontal surface, ball 10 will roll to the forward end 12 of surfboard 9. The angle at which board 9 is mounted, however, should not be so steep that when forward motion of the car starts, the ball cannot roll, by inertial force, to the rear 13 of board 9.

Wires 15 are shown entering the rear of the vehicle. These are control wires leading to the batteries and external switch. Inside car 1, the wires are connected to a reversible electric motor and an associated gear train adapted to move the rear wheels 3.

Figure 2:
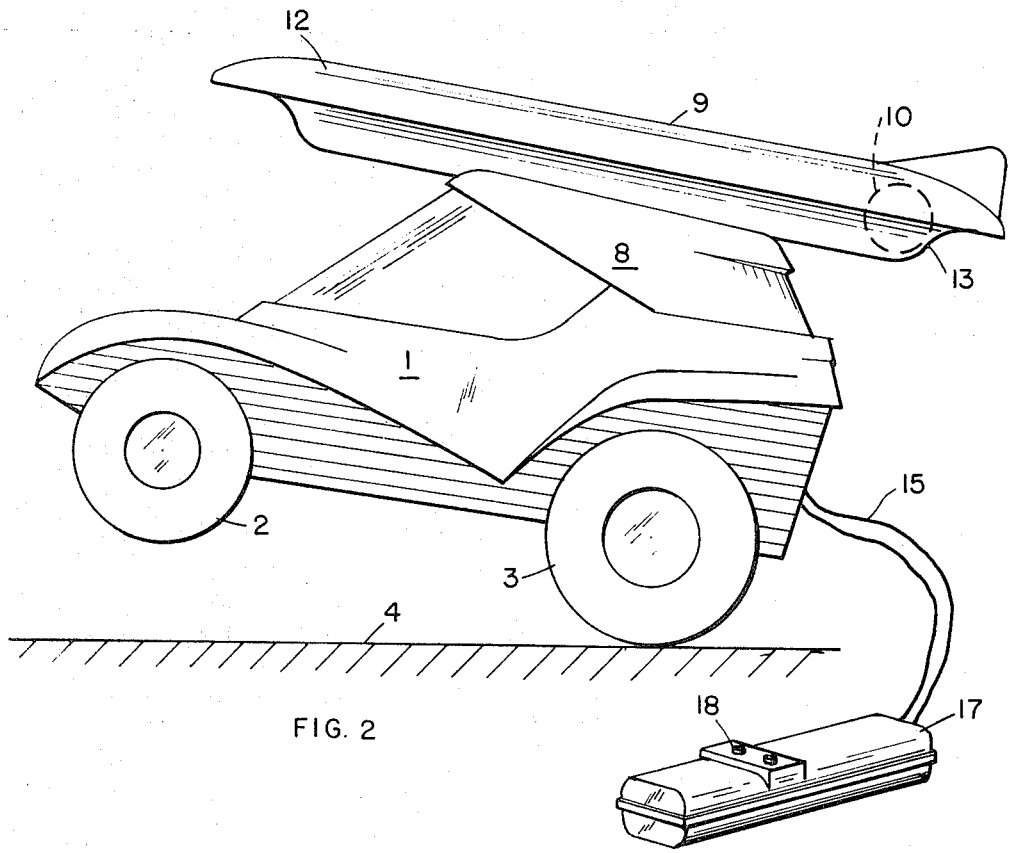
FIG. 2 is the same view just after the forward motion of the vehicle has commenced, showing how the front wheels have lifted off the ground due to the shift in weight of the ball within the surfboard.

Wires 15 lead to the control box 17 and switch 18, as shown in FIG. 2. Switch 18 is a reversing switch; and control box 17 also contains the batteries necessary to operate the motor.

Details of the control box, switch, motor, and gear train are not shown, because they are of standard design. The motor and gear train within car 1 must be so positioned relative to the remaining structure of car 1 that, at rest on a horizontal surface, with the ball 10 in its forward position, the center of gravity will be forward of the axis of rear wheels 3; that the center of gravity will be behind wheels 3 when, under the same circumstances, ball 10 is at the rear end 13 of board 9; that the motor can accelerate the vehicle rapidly enough so the ball will roll, by inertia, up the slope in the surfboard and to the rear; and that the braking power of the geared motor is adequate to overcome the temporary torque effect of having ball 10 in the rear, and so has braking power enough to bring the forward wheels 2 of the car back to the floor, after starting has raised them up from the floor.

FIG. 2 is the same as FIG. 1 except that it depicts the car just after forward motion has commenced. Front wheels 2 are off the floor 4 because ball 10, through inertia, has rolled to the rear portion 13 of board 9 and so has moved the center of gravity of the entire vehicle to the rear of the axis of the rear wheels 3. This lifting normally is a temporary state because, shortly after the wheels 2 have lifted from the floor, the motor is stopped and the braking motion of the rear wheels 3 stops moving the car forward and creates a counterclockwise torque in the body of the car 1 (counterclockwise as seen in the drawings) which will bring the front wheels back to the floor.

Figure 3:
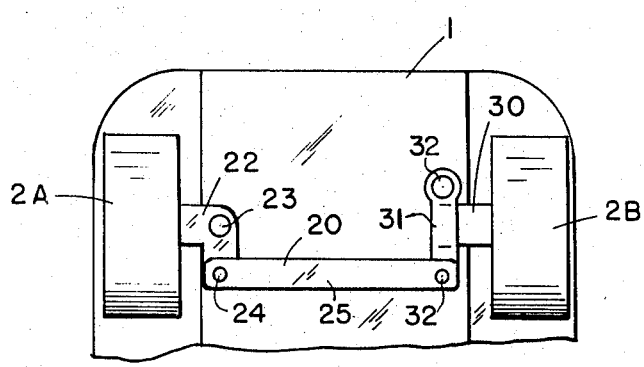
FIG. 3 is a view from underneath, showing the linkage interconnecting the front wheels, with the wheels pointed forward.
Figure 4:
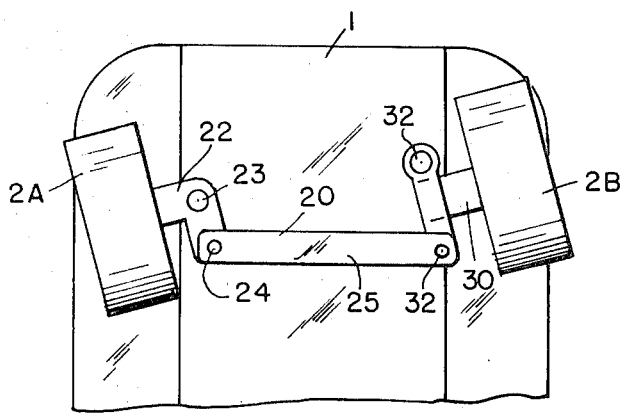
FIG. 4 is the same view as FIG. 3 except showing the turning action of the linkage when the toy vehicle is moving in reverse.

FIGS. 3 and 4 show the linkage associated with front wheels 2 for turning them when the vehicle is moving in a backward direction. FIG. 3 shows the position of the linkage when the vehicle is moving forward; FIG. 4, when it is moving backwards. Front wheels 2 are identified in these figures as 2A for the right wheels and 2B for the left.

Right wheel 2A has a crank arm 22 as its axle. Arm 22 is pivoted to the body of the car at pivot 23 and then extends rearwardly to pivotal connection 24 attaching it to linking arm 25. Pivot 23 is in line with the axis of wheel 2A.

Left front wheel 2B has its axle 30 connected to an arm 31 which is pivotally connected at pivot 32, forward of axle 33, to the body of the car 1. Rearward of axle 30 arm 31 is pivotally connected to linkage arm 25 by pivot 32. Linkage 25 runs transverse to the body of the car and serves to interconnect the wheels 2A and 2B. As can be seen by comparing FIGS. 3 and 4, linkage arm 25 is centered when the vehicle is moving forward but is offset toward the left side of the vehicle when the vehicle is moving in reverse. This off-setting is caused by the relative angles of the pivots and crank arms for the two wheels. The result is that, when the vehicle is moving forward, linkage 20 causes the wheels to point in the forward position; but when the vehicle is moving in reverse this same linkage, through the pivoting arrangement, causes the wheels to turn.

In operation, the child takes the toy and places it on the floor 4 and takes the remote control unit 17 and pushes either the forward or reverse button of reversing switch 18. When the vehicle is at rest on a level surface, gravity will cause ball 10 to roll to the forward, lower portion of board 9, causing the center of gravity of the vehicle to be forward of the axle of the rear wheels. When, however, the child pushes the forward button, car 1 will accelerate forward, and the inertia of ball 10 will cause it to move backwardly relative to the forward motion of the car. Quite quickly it will move to the rear end portion 13 of board 9, causing the center of gravity of the vehicle to be behind the axle of wheels 3. This will cause wheels 2 to lift off the floor as shown in FIG. 2.

Wheels 2 do not, however, remain forever off the floor because of the continuing forward motion of the vehicle during stoppage of the rear wheels 3. This forward motion gives a counterclockwise turning motion to the whole body of the buggy and so brings the front wheels 2 down to the floor. This also allows ball 10 to again roll forward under gravity and again shifts the center of gravity forward of the rear, driving wheels.

If the vehicle is stopped and then started again, the cycle will be repeated with the front wheels momentarily moving off the floor.

If the vehicle is stopped and put in reverse, all of the wheels will remain on the floor since the inertia effect and gravity cause ball 10 to remain in the forward position and so the center of gravity does not shift. The linkage 25, however, when the car is in reverse, will cause the wheels 2 to turn to one side as shown in FIG. 4. This will cause the whole vehicle to turn sharply in one direction. It will continue to turn as long as the vehicle is moving to the rear.

When the car is stopped in its reverse motion and is started forward, the front wheels will again jump off the floor. The overall effect of this forward and reverse switching is a buggy that is bucking up and down and appears to be twisting and changing its course in a haphazard, leaping manner.

What is claimed:

1. A remote-controlled, motor actuated toy vehicle capable of a bucking motion, said vehicle including a body, wheels on said body and a motor within said body for causing motion of the vehicle, an inertially acting means for shifting the center of gravity of said vehicle, said means causing the center of gravity of the vehicle to be forward of the rear wheels when said vehicle is at rest on a level surface and to cause such center of gravity to shift toward said rear wheels when said vehicle starts in forward motion, switch means external to said vehicle for actuating said motor, and said motor having sufficient torque after the initial rearward center of gravity shift to raise the front wheels of said car temporarily off the said surface when said vehicle commences forward motion.

2. A remote-controlled, motor-actuated toy vehicle capable of a bucking motion, said vehicle including a body, driving wheels on said body, a motor associated with said driving wheels for actuating same, a motor control switch remote from said vehicle, and a freely shiftable weight, said weight being mounted on said vehicle so as to be shiftable in a direction longitudinal of said vehicle to thereby move the center of gravity of said vehicle longitudinally during motion of said vehicle, whereby said center of gravity may shift from one side to the other of the axis of said driving wheels to cause a bucking motion of said vehicle.

3. A vehicle as set forth in claim 2 in which said shiftable weight is mounted so that it may move to one side of said axis through inertia and to the other side of said axis through gravity.

4. A vehicle as set forth in claim 3 in which said weight mounting is an inclined surface and said motor is capable of accelerating said vehicle sufficiently rapidly so that intertia of said weight may cause it to move up said surface and so shift said center of gravity.

5. A remote-controlled, motor-actuated toy vehicle capable of bucking motion, said vehicle including a body, wheels on said body and a motor within said body for causing motion of the vehicle, and inertially acting means for shifting the center of gravity of said vehicle, said means causing the center of gravity of the vehicle to be forward of the rear wheels when said vehicle is at rest on a level surface and to cause such center of gravity to shift toward said rear wheels when said vehicle starts in forward motion, switch means external to said vehicle for actuating said motor, said motor having sufficient torque after the initial rearward center of gravity shift to raise the front wheels of the vehicle temporarily off of the said surface when said vehicle commences forward motion, and said inertially acting center of gravity means including a hollow unit mounted on said vehicle and projecting both forward and to the rear of said rear wheels and a weight within said unit adapted for inertial motion within said unit to shift the center of gravity of said vehicle.

6. The toy vehicle as set forth in claim 5 in which said weight is a weighted ball free to roll within said hollow unit, and in which said hollow unit is at such an angle that the ball is forward of said rear wheels when said vehicle is at rest on a level surface.

7. A remote-controlled, motor-actuated toy vehicle capable of a bucking motion, said vehicle including a body, wheels on said body and a motor within said body for causing motion of the vehicle, an inertially acting means for shifting the center of gravity of said vehicle, an inertially acting means for shifting the center of gravity of the vehicle to be forward of the rear wheels when said vehicle is at rest on a level surface and to cause such center of gravity to shift toward said rear wheels when said vehicle starts in forward motion, switch means external to said vehicle for actuating said motor, said motor having sufficient torque after the initial rearward center of gravity shift to raise the front wheels of the vehicle temporarily off of the said surface when said vehicle commences forward motion, and said motor being a reversing motor and said external control means includes a reversing switch whereby said vehicle may alternately be made to move forward and backward.

8. The toy vehicle as set forth in claim 7 including front wheels pivotally mounted for steering and having associated linkage adapted to cause said wheels to point forward when said vehicle is moving forward and to turn sideways when said vehicle is moving in reverse, said linkage including a crank arm associated with one of said wheels, a linkage arm interconnection between said wheels, and said pivotal mounting in the other of said wheels being forward of the axle thereof.

References Cited

UNITED STATES PATENTS

| 617,209 | 1/1899 | Watt | 46—1 |
|---|---|---|---|
| 1,001,263 | 8/1911 | French | 46—1 |
| 1,577,743 | 7/1926 | Mohr | 180—1 |
| 1,682,764 | 10/1928 | Sarff | 180—1 |
| 2,936,386 | 5/1960 | Cohn | 310—50 |
| 3,102,363 | 9/1963 | Ferriot | 46—244 |

RUSSELL R. KINSEY, Primary Examiner

R. F. CUTTING, Assistant Examiner

U.S. Cl. X.R.

46—202, 210